United States Patent
Patberg et al.

(10) Patent No.: US 10,449,723 B2
(45) Date of Patent: Oct. 22, 2019

(54) METHOD AND DEVICE FOR PRODUCING A COMPOSITE MATERIAL

(71) Applicant: THYSSENKRUPP STEEL EUROPE AG, Duisburg (DE)

(72) Inventors: Lothar Patberg, Moers (DE); Klaus-Peter Koch, Schwelm (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 443 days.

(21) Appl. No.: 14/912,009

(22) PCT Filed: Aug. 8, 2014

(86) PCT No.: PCT/EP2014/067105
§ 371 (c)(1),
(2) Date: Feb. 12, 2016

(87) PCT Pub. No.: WO2015/022275
PCT Pub. Date: Feb. 19, 2015

(65) Prior Publication Data
US 2016/0193779 A1 Jul. 7, 2016

(30) Foreign Application Priority Data
Aug. 16, 2013 (DE) .................. 10 2013 013 495

(51) Int. Cl.
*B29C 65/00* (2006.01)
*B29C 65/10* (2006.01)
(Continued)

(52) U.S. Cl.
CPC ........ *B29C 65/103* (2013.01); *B29C 65/1412* (2013.01); *B29C 65/1425* (2013.01);
(Continued)

(58) Field of Classification Search
CPC .............. B29C 65/103; B29C 65/1412; B29C 65/1425; B29C 65/1432; B29C 65/16; B32B 37/06
See application file for complete search history.

(56) References Cited

U.S. PATENT DOCUMENTS 4,511,419 A * 4/1985 Kuhlmann .............. B29C 59/14
156/272.6
4,597,818 A * 7/1986 Aoyama ................. B32B 27/32
156/308.2
(Continued)

FOREIGN PATENT DOCUMENTS

CN 101688084 A 3/2010
DE 2118230 A1 11/1972
(Continued)

OTHER PUBLICATIONS

Machine Translation of JP07-070335 (Year: 1995).*
(Continued)

*Primary Examiner* — Daniel McNally
(74) *Attorney, Agent, or Firm* — Lathrop Gage L.L.P.

(57) ABSTRACT

Devices and methods for producing sandwich composite materials having at least one layer of plastic disposed between at least two outer metallic covering layers may comprise providing at least two semifinished products coated with plastic on one side, activating at least one of the plastic-coated sides of the metallic covering layers directly from the side of the covering layer having the plastic-coating, and connecting the plastic-coated sides of the metallic covering layers to form the sandwich composite material. The activation of the plastic may be performed by way of a heat source that utilizes an activation medium, radiation, or plasma, for example.

8 Claims, 3 Drawing Sheets

(51) Int. Cl.
    *B29C 65/14*       (2006.01)
    *B32B 37/06*       (2006.01)
    *B32B 37/20*       (2006.01)
    *B29C 65/16*       (2006.01)
    *B32B 7/12*        (2006.01)
    *B32B 15/085*      (2006.01)
    *B32B 15/088*      (2006.01)
    *B32B 15/18*       (2006.01)
    *B32B 27/08*       (2006.01)
    *B32B 27/16*       (2006.01)
    *B32B 27/32*       (2006.01)
    *B32B 27/34*       (2006.01)
    *B32B 37/04*       (2006.01)
    *B32B 37/10*       (2006.01)
    *B32B 38/00*       (2006.01)
    *B32B 15/04*       (2006.01)

(52) U.S. Cl.
    CPC .......... *B29C 65/1432* (2013.01); *B29C 65/16* (2013.01); *B29C 66/1122* (2013.01); *B29C 66/45* (2013.01); *B29C 66/72321* (2013.01); *B29C 66/83413* (2013.01); *B29C 66/83423* (2013.01); *B29C 66/91941* (2013.01); *B32B 7/12* (2013.01); *B32B 15/085* (2013.01); *B32B 15/088* (2013.01); *B32B 15/18* (2013.01); *B32B 27/08* (2013.01); *B32B 27/16* (2013.01); *B32B 27/32* (2013.01); *B32B 27/34* (2013.01); *B32B 37/06* (2013.01); *B32B 37/20* (2013.01); *B29C 65/1464* (2013.01); *B29C 65/1632* (2013.01); *B29C 65/1664* (2013.01); *B29C 66/028* (2013.01); *B29C 66/3474* (2013.01); *B29C 66/71* (2013.01); *B29C 66/73921* (2013.01); *B29C 66/91921* (2013.01); *B29C 66/91931* (2013.01); *B32B 15/04* (2013.01); *B32B 37/04* (2013.01); *B32B 37/1027* (2013.01); *B32B 38/0004* (2013.01); *B32B 2270/00* (2013.01); *B32B 2307/546* (2013.01); *B32B 2307/732* (2013.01); *B32B 2309/105* (2013.01); *B32B 2310/08* (2013.01); *B32B 2311/30* (2013.01)

(56) References Cited

U.S. PATENT DOCUMENTS

| | | |
|---|---|---|
| 5,633,064 A | 5/1997 | Ragland et al. |
| 5,658,634 A | 8/1997 | Ragland et al. |
| 6,270,599 B1 * | 8/2001 | Wood ...................... B29C 35/10 156/272.2 |
| 2007/0178302 A1 | 8/2007 | Esser |
| 2010/0151231 A1 * | 6/2010 | Matsuo ............... B29C 66/8322 428/336 |
| 2010/0323192 A1 | 12/2010 | Matsuo et al. |
| 2010/0323193 A1 | 12/2010 | Matsuo et al. |
| 2012/0205387 A1 * | 8/2012 | Manabe ................... B32B 7/12 220/626 |

FOREIGN PATENT DOCUMENTS

| | | | |
|---|---|---|---|
| DE | 69033934 T2 | 11/2002 | |
| JP | 07070335 A * | 3/1995 | ............ B29C 66/45 |
| JP | H07-70335 A | 3/1995 | |
| JP | 3714338 A | 11/2004 | |
| JP | 2005-203628 A | 7/2005 | |
| JP | 2005199615 A | 7/2005 | |
| WO | 2012/052250 A2 | 4/2012 | |

OTHER PUBLICATIONS

Int'l Search Report for PCT/EP2014/067105 dated Nov. 12, 2014 (mailed Nov. 21, 2014).
English Language Abstract of DE2118230.

* cited by examiner

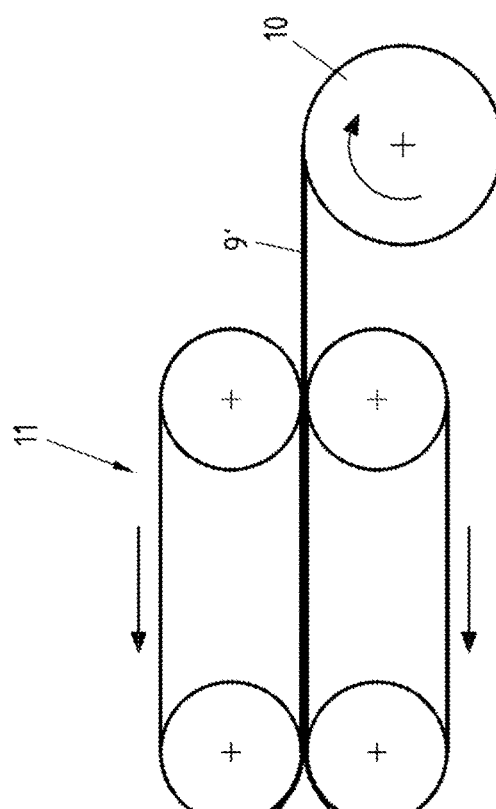
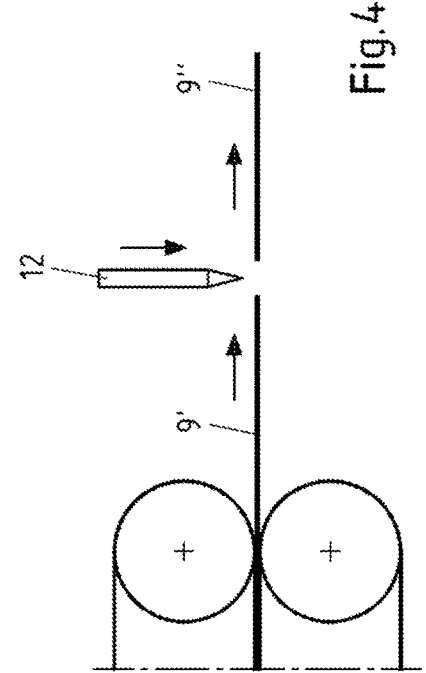
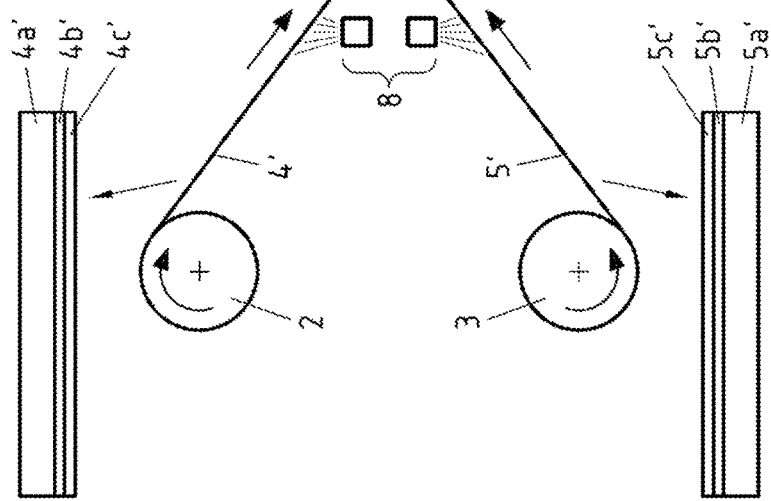
Fig. 3
Fig. 4

METHOD AND DEVICE FOR PRODUCING A COMPOSITE MATERIAL

CROSS REFERENCE TO RELATED APPLICATIONS

This application is a U.S. National Stage Entry of International Patent Application Serial Number PCT/EP2014/067105, filed Aug. 8, 2014, which claims priority to German Patent Application No. DE 102013013495.1 filed Aug. 16, 2013, the entire contents of both of which are incorporated herein by reference.

FIELD

The present disclosure relates to methods and devices for producing sandwich composite materials and, in particular, sandwich composite materials comprising semifinished products coated with plastic.

BACKGROUND

The prior art already discloses connecting metal semifinished products which are coated on one side with at least one plastic layer to one another in order to form a sandwich composite material. For example, German laid-open specification 21 18 230 discloses connecting corresponding semifinished products which are coated with a plastic layer on one side in a discontinuous method in which the metallic side of the semifinished product is heated, so that the plastic layer softens and the two semifinished products are then pressed against one another by way of the plastic sides of said semifinished products, so that the plastic layers are connected to one another. In continuous methods, it is known, for example, to connect two strip-like semifinished products, which are coated with at least one plastic layer, by means of the plastic layers in order to form a sandwich composite material in which heat is introduced into the metallic covering layers of the semifinished products by means of a twin-belt press, so that the plastic layer softens and therefore a connection is made with the opposite plastic layer. One problem with introducing heat in order to activate the plastic layer is that, on account of the transportation of heat from the metallic covering layer of the semifinished product to the opposite side of the semifinished product, which side establishes the connection, relatively high temperatures have to be applied in order to reach the targeted temperature in the boundary region of the two plastic layers. In this case, there is a risk of the plastic layer melting and delaminating in the region of the metal because said metal is at a higher temperature than the plastic surface of the semifinished product.

BRIEF DESCRIPTION OF THE FIGURES

FIG. 3 is a schematic view of an example apparatus having a twin-belt press for producing sandwich composite materials.

FIG. 4 is a partial schematic view of an example apparatus having a mechanism for cutting sandwich composite materials to length.

DETAILED DESCRIPTION

Figure 1:
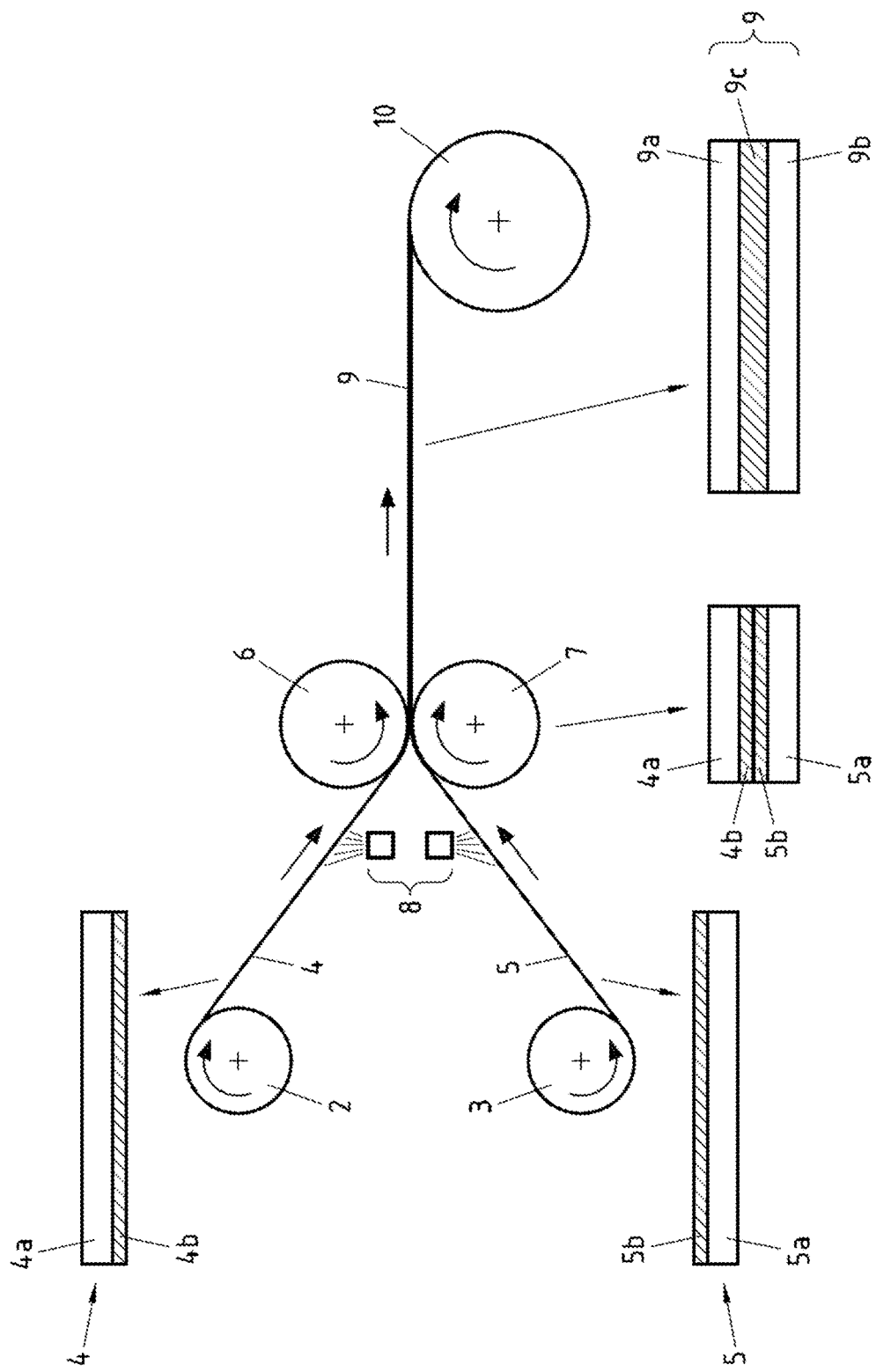
FIG. 1 is a schematic view of an example apparatus for producing sandwich composite materials.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns methods and devices for producing sandwich composite materials having at least two outer metallic covering layers and at least one plastic layer arranged between the covering layers. In some examples, at least two metallic semifinished products coated on one side with plastic are provided. To establish a connection between the plastic layers of the semifinished products, at least one of the plastic-coated sides of the metallic semifinished products may be activated before the connection operation. The semifinished products may be connected by way of the plastic-coated sides to form a sandwich composite material. Likewise, the present disclosure concerns apparatuses for producing sandwich composite materials with at least two metallic covering layers and at least one plastic layer arranged between the metallic covering layers. One example apparatus may comprise unwinding reels for a strip-like semifinished product. Each semifinished product may have a metallic strip coated with at least one plastic layer on one side. The apparatus may also include a mechanism for continuously connecting the two semifinished products over a large area by way of the plastic-coated sides of the semifinished products.

One example object of the present disclosure is to provide a method which ensures an improvement in process reliability during production of sandwich composite materials comprising semifinished products which are coated with at least one plastic layer on one side. A further example object of the disclosure is to propose an advantageous apparatus for producing corresponding sandwich composite materials in an economical manner.

In some cases, the example object described above is achieved in that the activation of the plastic layer of the semifinished products takes place directly from the plastic-coated side of the semifinished product.

In contrast to the method known to date, in which the activation has been carried out by heating the plastic layer by means of the metal layer, the plastic layer is directly activated, that is to say the activation takes place from the plastic surface side, so that the activation processes negative effects on the connection between the plastic layer and the metal layer are effectively prevented. In particular, the risk of delamination of the semifinished products, which are to be connected, during the connection process or at a later point in time can be considerably reduced.

According to a first refinement of the method according to the invention, the activation takes place by heat, by the action of an activation medium, by radiation and/or by the action of a plasma directly onto the plastic surface of at least one semifinished product. The activation by heat is a particularly simple method of activating a plastic layer, for example a thermoplastic layer. Activation within the meaning of the present application means that the plastic layer or the surface of said plastic layer is changed to a state in which said plastic layer can be connected to a further plastic layer. Furthermore, it is possible to activate the surface of at least one semifinished product, which is coated on one side, by the action of an activation medium, for example a gas, for example ozone, or a solvent. In addition, the surface of a plastic can be changed by radiation, for example UV radiation, or by the action of a plasma such that said surface forms a connection with a further plastic layer when it is pressed on to said plastic layer. All methods share the common feature that the activation of the plastic layer of the at least one semifinished product takes place directly from the side of the plastic surface of the semifinished product.

According to a further refinement, the surface of the plastic layer of at least one semifinished product is heated to a temperature below a critical temperature, and a temperature gradient which is negative in the direction of the metallic covering layer is generated in the plastic layer. The melting point, but also a specific softening point, for example the glass transition temperature point, can be used as the critical temperature, for example depending on the respective plastic, in order to achieve as optimum a connection process between the plastic surfaces of the two semifinished products, which plastic surfaces are to be connected. In this case, the critical temperature is dependent on the choice of the respective plastic of the surface. Owing to the negative temperature gradient introduced, the temperature of the plastic falls in relation to the metallic covering layer. As a result, the metal/plastic connection is protected against negative influences owing to the plastic surface and a maximum degree of activation of the plastic layer is achieved.

If, according to a further refinement of the method, the input of heat takes place in a radiative manner by means of laser, LEDs, microwave radiation or infrared radiation sources, a negative temperature gradient can be created in a simple manner in the plastic layer in a contact-free manner owing to the exponentially falling absorption of the energy from the radiation introduced. It goes without saying that this also applies for convective input of heat, for example by subjecting the plastic layers to the action of hot air.

Plastic layers of the semifinished products, which plastic layers comprise polyamide, polyethylene or a blend of polyamide and polyethylene, are preferably connected to one another. Polyethylenes and polyamides are distinguished by particularly good processing properties when coating metallic surfaces and can be activated, for example by heating, in a simple manner. A blend of polyamide and polyethylene leads to the combination of the properties of two plastics with one another in one layer.

According to a next refinement of the method, two strip-like semifinished products which are coated with at least one plastic layer are unwound from a coil, and the two semifinished products are connected to one another by means of the plastic layers in a continuous manner after the activation of at least one of the plastic layers of the semifinished products. As a result, a particularly economical production method can be provided for producing a sandwich composite material since large quantities of the sandwich composite material with constant properties can be produced during the continuous connection of the semifinished products to one another.

According to a further refinement of the method, the sandwich composite material can be very effectively matched to the strength requirements in the respective fields of application by semifinished products which have metallic covering layers which are composed of steel and have a thickness of from 0.1 mm to 0.5 mm being connected. The strength of the sandwich composite material can be highly influenced not only by means of selecting the steel grade, but also by means of the thickness of from 0.1 mm to 0.5 mm. For example, particularly lightweight and nevertheless high-strength sandwich composite materials can be produced by using high-strength steel grades for the metallic covering layers. However, if such high-strength requirements are not of primary importance, steel grades which are more cost-effective can also be used. However, in principle, it is also possible for other materials to be used as metallic covering layers, for example aluminum alloys or magnesium alloys.

If semifinished products according to a further refinement of the method which have a plastic layer with a thickness of from 0.1 to 0.8 mm before the connection operation are connected, firstly a sufficient saving in weight can be provided by the plastic layer and secondly easy connection of the semifinished products which are coated with a plastic layer on one side can be guaranteed. As the thickness of the plastic layer increases, the saving in weight in comparison to a solid material increases.

If semifinished products which, according to a further refinement of the method, have at least one adhesion-promoting layer between the metal layer and the plastic layer are connected to one another, the risk of delamination of the sandwich composite material during the production process or at a later point in time can be further reduced. The adhesion-promoting layer between the metal layer and the plastic layer ensures an increased level of adhesion between the two layers.

If, according to a further refinement, the connection of the semifinished products takes place with a roller arrangement, wherein at least one pair of rollers is arranged in such a way that said pair of rollers provides a rolling gap in which the strip-like semifinished products are connected to one another, a kind of lamination process can be provided which exhibits very good production capacities. In principle, the production rate of a pair of rollers for producing the sandwich composite material is greater than that of a twin-belt press as has been used to date.

Finally, as an alternative, a twin-belt press can be used for connecting the semifinished products according to a further refinement.

According to a second teaching of the present invention, the object described above is achieved by an apparatus of the generic type in that means are provided with which the plastic layer of at least one of the semifinished products can be activated directly from the side of the plastic layer of the respective semifinished product by heat, by the action of an activation medium, by radiation and/or by the action of a plasma.

As already explained above, the direct activation of the plastic surface of the at least one plastic layer of the semifinished product makes it possible to control the activation of the surface very effectively and then to supply said semifinished product to the connection process. In particular, the risk of delamination of the sandwich composite material is considerably reduced.

According to a further refinement of the apparatus, a twin-belt press or at least one pair of rollers is provided as means for connecting the semifinished products. Strip-like semifinished products can be connected to one another in a particularly effective and economical manner by both apparatuses. However, the pair of rollers provides the greater productivity in this case.

If the means for activating the plastic layer of at least one of the strip-like semifinished products are arranged immediately upstream of the means for connecting the semifinished products in the belt running direction, it is possible, in a simple manner, to carry out the activation of the plastic surface of at least one of the semifinished products, which is coated on one side, immediately before the connection process. If the activation is carried out by an input of heat for example, it is possible, in a simple manner, to maintain the temperature up until connection of the two semifinished products by means of the plastic-coated sides of said semifinished products.

Finally, the apparatus can advantageously be developed by a winding-up reel for the sandwich composite material or an apparatus for cutting blanks of the sandwich composite material to length being provided. In this way, the sandwich composite material can be prepared both for strip-like processing and also for further processing of blanks in both variants.

FIG. 1 shows a schematic illustration of a first exemplary embodiment of an apparatus 1 for producing a sandwich composite material, which apparatus has a respective unwinding reel 2, 3 for each semifinished product 4, 5. The semifinished products 4 and 5 comprise a metal layer 4a, 5a and also plastic layers 4b, 5b which are arranged on the metal layers 4a, 4b. The plastic layers 4b, 5b are composed of polyethylene or polyamide for example, but preferably also of a blend of polyethylene and polyamide. Said plastic layers have a thickness of from 0.1 mm to 0.8 mm. The strip-like semifinished products 4, 5 are unwound from the respective unwinding reel and supplied to a pair of rollers 6, 7 in such a way that the two plastic layers of the semifinished products 4b, 5b are opposite one another. Immediately before the semifinished products are inserted into the rolling gap between the rollers 6, 7, the plastic layers 4b, 5b of the two semifinished products 4, 5 are activated from the plastic surface side using means 8.

In contrast to the previous methods, in which the activation took place by, for example, heating the metal layer, that is to say from the side of the metal layer, it is possible for only the energy which is required to activate the plastic surface which establishes the connection to be introduced as a result of activating the plastic layer from the plastic side or the plastic surface of the plastic-coated semifinished products. As a result, it is possible, for example, for more intense heating of the connection between the metal and the plastic to be effectively avoided. Furthermore, other activation media, for example a solvent or ozone, can also be used owing to direct activation of the plastic surface layer.

However, particularly simple means for activating the plastic surface layer are provided by means 8 which cause an input of heat. Said means can heat the plastic surface layer of at least one semifinished product, but preferably both semifinished products, in a radioactive or convective manner. The radioactive means used can be, for example, LEDs, lasers, microwave radiators or infrared radiation sources. A simple hot air fan can also be used for convectively heating the plastic surface layer and can be adjusted very precisely in respect of the critical temperature. The maximum critical temperature can be, for example, the melting point of the plastic of the plastic layer since the plastic may lose its surface geometry in the event of melting. However, it may also be sufficient for activating the plastic surface layer to provide heating to a temperature in the region of the glass transition temperature in order to later connect the two plastic layers between the pair of rollers 6, 7.

By way of example, means for measuring the temperature of the plastic surface layer are preferably also integrated into the means 8 for activating the plastic surface layer, so that the process can be controlled very easily. In the rolling gap which is provided between the rollers 6 and 7, the two semifinished products 4, 5 are pressed against one another, so that the two plastic layers 4b, 5b come into contact. In this respect, FIG. 1 shows a schematic sectional view through the sandwich composite material at the point at which the two plastic layers 4b, 5b make contact.

Owing to the activation of the plastic layers, said plastic layers form a single plastic layer over the further course of time, as is shown in the next schematic sectional view in FIG. 1 of the composite material 9 after the lamination. The two metal layers 9a and 9b now enclose only one single plastic layer 9c. The metal layers 9a and 9b are preferably composed of a steel with a thickness of from 0.1 mm to 0.5 mm. The strength of the sandwich composite material which is to be produced can be adjusted by means of the steel grades together with the selection of thickness in said range. For example, a considerable increase in strength or a considerable reduction in the thickness while at the same time maintaining the strength can be achieved by selecting high-strength steel grades for the metallic covering layers 9a and 9b of the sandwich composite material.

The plastic layer 9c of the sandwich composite material preferably has a thickness of from 0.3 mm to 1.5 mm. The sandwich composite material 9 which is produced in this way can then be wound up by means of a winding-up reel 10, for example in order to form a coil.

Figure 2B:
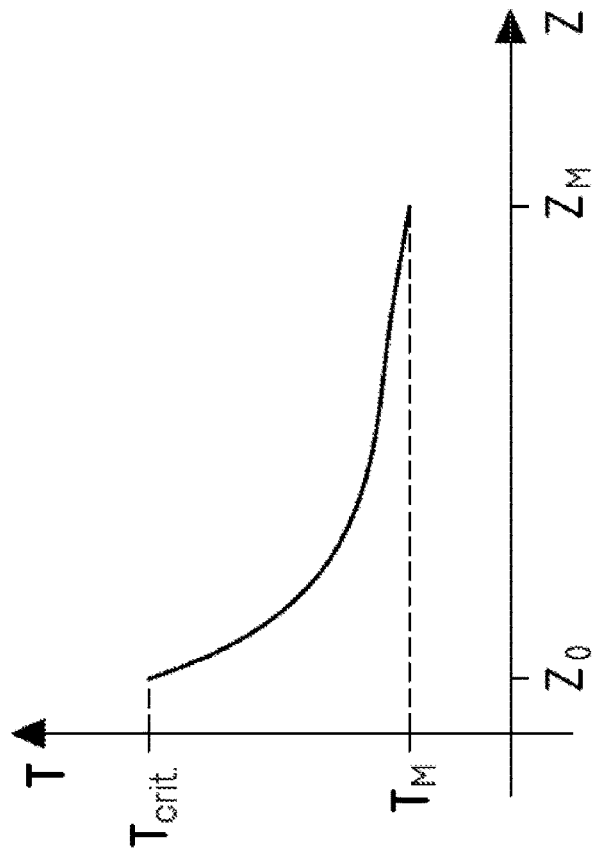
FIG. 2b is a chart indicating a temperature profile of a plastic layer of the semifinished product in FIG. 2a following activation.
Figure 2A:
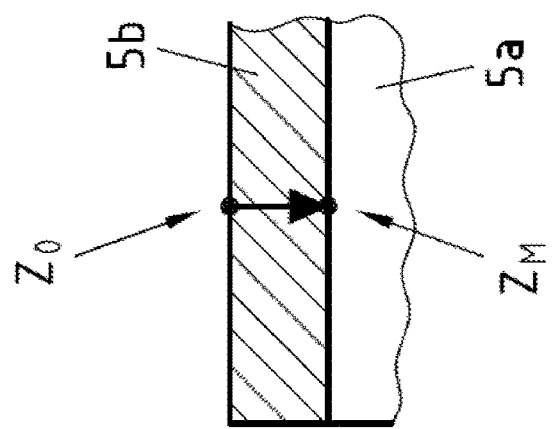
FIG. 2a is a detail cross-sectional view of a plastic layer of an example semifinished product following activation.

FIG. 2a shows a detail of the plastic surface layer 5b with the metallic covering layer 5a situated beneath it. Furthermore, FIG. 2a shows the plastic surface with the coordinate $Z_0$ and the boundary layer to the metallic covering layer with the coordinate $Z_M$. In the illustrated exemplary embodiment, the plastic layer 5b has been activated by an input of heat. The activation method according to the invention by heating the plastic layer directly from the plastic-coated side of the semifinished product results in a negative temperature gradient being produced in the plastic layer in the direction of the metallic covering layer 5a.

This is schematically shown in a graph in FIG. 2b. A correspondingly typical, approximately exponential profile is achieved by means 8 for activating the plastic layer of the semifinished products, which means transmit heat in a radiative or convective manner. The temperature gradient which is illustrated in the graph in FIG. 2b shows that a critical temperature can be set at the coordinate $Z_0$ on the plastic surface, and the temperature drops in the direction of the metallic covering layer $Z_M$. This ensures that, when a specific, optimum process temperature for connecting the plastic layers is set, the connection with respect to the metallic covering layer is not affected. This can at least result in a high degree of reliability that a critical temperature will not be exceeded in the region of the connection between the metallic covering layer 4a, 5a and the plastic layer 4b and 5b.

FIG. 3 shows, in a further exemplary embodiment of the apparatus for producing a sandwich component, an alternative variant to the apparatus 1. The apparatus 1' has a twin-belt press 11 which connects the supplied semifinished products 4' and 5' to one another, in order to form a sandwich composite material, after the direct activation of the plastic surface of the semifinished products 4', 5'. The strip-like sandwich composite material is then wound up using a winding-up reel 10. However, the semifinished products 4', 5' in FIG. 3 differ from the semifinished products 4 and 5 illustrated in FIG. 2. In addition to the metal layers 4a' and 5a', at least one adhesion-promoting layer 5b' and respectively 4b' which considerably improve the connection between the metal layers 4a' and 5a' in relation to the plastic layer 4c', 5c' are additionally provided.

An alternative refinement of the last processing step of the apparatus illustrated in FIG. 3, specifically winding up the material in order to form a coil using a winding-up reel 10, is schematically illustrated in FIG. 4. The sandwich composite material 9' produced is cut into blanks 9" by means of an apparatus 12 for cutting material to length. Sheets which are composed of the sandwich composite material and have already been separated can be provided in this way.

Although either winding up said material or cutting said material to length is illustrated in the figures as a further processing step after connection of the semifinished products 4, 5 and, respectively, 4', 5', it goes without saying that it is also feasible for further processing steps to be subsequently added, for example additional coating of the outer, metallic covering layers of the sandwich composite material. Other processing steps are also feasible.

What is claimed is:

1. A method for producing a sandwich composite material having at least one layer of plastic disposed between at least two outer metallic covering layers, the method comprising:
   providing a first metallic semifinished product having at least one side coated with plastic and a second metallic semifinished product having at least one side coated with plastic by unwinding the first metallic semifinished product from a first coil and unwinding the second metallic semifinished product from a second coil;
   activating the plastic-coated side of at least one of the first metallic semifinished product or the second metallic semifinished product directly from the plastic-coated side; and
   connecting, in a continuous manner, the plastic-coated sides of the first and second metallic semifinished products after the activation to form the sandwich composite material;
   whereby activating the plastic-coated side of the at least one of the first metallic semifinished product or the second metallic semifinished product comprises heating a surface of a plastic layer of the plastic-coated side to a temperature below a critical temperature so as to generate a temperature gradient in the plastic layer of the plastic-coated side that is negative in a direction of the respective at least one of the first metallic semifinished product or the second metallic semifinished product;
   wherein the critical temperature is at least one of a melting temperature or a glass transition temperature of the plastic layer of the plastic-coated side; and
   wherein the plastic layer of the plastic-coated side of each of the first and second metallic semifinished products comprises polyamide, polyethylene, or a blend of polyamide and polyethylene.

2. The method of claim 1 wherein activating the plastic-coated side of at least one of the first metallic semifinished product or the second metallic semifinished product takes place by heating directly on the plastic-coated side by action of at least one of an activation medium, radiation, or plasma.

3. The method of claim 1 wherein activating the plastic-coated side of at least one of the first metallic semifinished product or the second metallic semifinished product comprises applying heat in a radiative manner by at least one of a laser, an LED, a microwave radiation source, or an infrared radiation source.

4. The method of claim 1 wherein each of the first and second metallic semifinished products is a semifinished product with a metallic covering layer comprised of steel and having a thickness of between 0.1 to 0.5 mm.

5. The method of claim 1 wherein the plastic-coated side of each of the first and second metallic semifinished products comprises a plastic layer with a thickness of between 0.1 to 0.8 mm before the connection.

6. The method of claim 1 wherein each of the first and second metallic semifinished products comprises at least one adhesion-promoting layer disposed between a plastic layer and metal.

7. The method of claim 1 wherein connecting the plastic-coated sides of the first and second metallic semifinished products comprises using a roller arrangement having at least one pair of rollers with a rolling gap in which the plastic-coated sides of the first and second metallic semifinished products are connected.

8. The method of claim 1 wherein connecting the plastic-coated sides of the first and second metallic semifinished products comprises using a twin-belt press.

* * * * *